United States Patent
Caskey et al.

(10) Patent No.: US 8,433,572 B2
(45) Date of Patent: *Apr. 30, 2013

(54) METHOD AND APPARATUS FOR MULTIPLE VALUE CONFIRMATION AND CORRECTION IN SPOKEN DIALOG SYSTEM

(75) Inventors: Sasha Porto Caskey, New York, NY (US); Juan Manuel Huerta, Bronx, NY (US); Roberto Pieraccini, Peekskill, NY (US)

(73) Assignee: Nuance Communications, Inc., Burlington, MA (US)

( * ) Notice: Subject to any disclaimer, the term of this patent is extended or adjusted under 35 U.S.C. 154(b) by 561 days.

This patent is subject to a terminal disclaimer.

(21) Appl. No.: 12/061,291

(22) Filed: Apr. 2, 2008

(65) Prior Publication Data
US 2008/0183470 A1    Jul. 31, 2008

Related U.S. Application Data

(63) Continuation of application No. 11/117,948, filed on Apr. 29, 2005.

(51) Int. Cl.
| | |
|---|---|
| G10L 15/04 | (2006.01) |
| G10L 15/00 | (2006.01) |
| G10L 13/08 | (2006.01) |
| G10L 13/00 | (2006.01) |
| G10L 11/00 | (2006.01) |
| G10L 21/00 | (2006.01) |
| G10L 15/20 | (2006.01) |
| G10L 15/26 | (2006.01) |
| G10L 15/06 | (2006.01) |
| G06F 17/27 | (2006.01) |
| G06F 17/21 | (2006.01) |

(52) U.S. Cl.
USPC ........... 704/255; 704/257; 704/260; 704/261; 704/270; 704/270.1; 704/275; 704/233; 704/235; 704/243; 704/9; 704/10; 704/251

(58) Field of Classification Search .......... 704/255, 704/257, 270, 270.1, 275, 258, 260, 261, 704/233, 235, 243, 9, 10, 251
See application file for complete search history.

(56) References Cited

U.S. PATENT DOCUMENTS

| | | | | |
|---|---|---|---|---|
| 4,158,750 A | * | 6/1979 | Sakoe et al. | 704/251 |
| 6,067,521 A | * | 5/2000 | Ishii et al. | 704/275 |

(Continued)

OTHER PUBLICATIONS

Yankelovich, N. (1996), "How do users know what to say?", Interactions, vol. 3, p. 32-43.*

(Continued)

Primary Examiner — Edgar Guerra-Erazo
(74) Attorney, Agent, or Firm — Wolf, Greenfield & Sacks, P.C.

(57) ABSTRACT

A method for multiple value confirmation and correction in spoken dialog systems. A user is allowed to correct errors in values captured by the spoken dialog system, such that the interaction necessary for error correction between the system and the user is reduced. When the spoken dialog system collects a set of values from a user, the system provides a spoken confirmation of the set of values to the user. The spoken confirmation comprises the set of values and possibly pause associated with each value. Upon hearing an incorrect value, the user may react and barge-in the spoken confirmation and provide a corrected value. Responsive to detecting the user interruption during the pause or after the system speaking of a value, the system halts the spoken confirmation and collects the corrected value. The system then provides a new spoken confirmation to the user, wherein the new spoken confirmation includes the corrected value.

19 Claims, 4 Drawing Sheets

```
START:
702 — set j = 0
704 — PLAY C(0,j)
706 — set i = 1;
708 — while ( i <= N) {
    710 — PLAY C(i,j) and ACTIVATE G(i)
    712 — if (barge-in ) {
        714 { collect new V(i) from speech recognition engine
              set i = 0;
              set j = j + 1;
              PLAY C(0,j);
        }
    716 — set i = i + 1;
}
```

U.S. PATENT DOCUMENTS

| | | | |
|---|---|---|---|
| 6,510,411 B1 * | 1/2003 | Norton et al. | 704/254 |
| 6,539,359 B1 * | 3/2003 | Ladd et al. | 704/275 |
| 7,058,577 B2 * | 6/2006 | Surace et al. | 704/270 |
| 7,069,221 B2 * | 6/2006 | Crane et al. | 704/275 |
| 7,228,278 B2 * | 6/2007 | Nguyen et al. | 704/257 |
| 7,487,085 B2 * | 2/2009 | Ativanichayaphong et al. | 704/235 |
| 7,552,055 B2 * | 6/2009 | Lecoeuche | 704/270.1 |
| 7,624,016 B2 * | 11/2009 | Ju et al. | 704/270 |
| 2002/0184031 A1 * | 12/2002 | Brittan et al. | 704/260 |
| 2003/0046086 A1 * | 3/2003 | Yuschik | 704/275 |
| 2003/0125958 A1 * | 7/2003 | Alpdemir et al. | 704/275 |
| 2003/0158732 A1 * | 8/2003 | Pi et al. | 704/251 |
| 2003/0163309 A1 * | 8/2003 | Yamada et al. | 704/231 |
| 2003/0187657 A1 * | 10/2003 | Erhart et al. | 704/270.1 |
| 2003/0233230 A1 * | 12/2003 | Ammicht et al. | 704/235 |
| 2004/0049375 A1 * | 3/2004 | Brittan et al. | 704/9 |
| 2004/0083107 A1 * | 4/2004 | Noda et al. | 704/270 |
| 2004/0085162 A1 * | 5/2004 | Agarwal et al. | 333/196 |
| 2005/0010393 A1 * | 1/2005 | Danieli et al. | 704/9 |
| 2005/0165607 A1 * | 7/2005 | Di Fabbrizio et al. | 704/256 |
| 2005/0203747 A1 * | 9/2005 | Lecoeuche | 704/270.1 |
| 2005/0246173 A1 * | 11/2005 | Creamer et al. | 704/270 |

OTHER PUBLICATIONS

I. Bulyko, K. Kirchhoff, M. Ostendorf, J. Goldberg, Error-correction detection and response generation in a spoken dialogue system, Speech Communication, vol. 45, Issue 3, Mar. 2005, pp. 271-288.*
Heins, R., Franzke, M., Durian, M., and Bayya, A. (1997). Turntaking as a design principle for barge-in in spoken language systems. International Journal of Speech Technology, 2:155-164.*

* cited by examiner

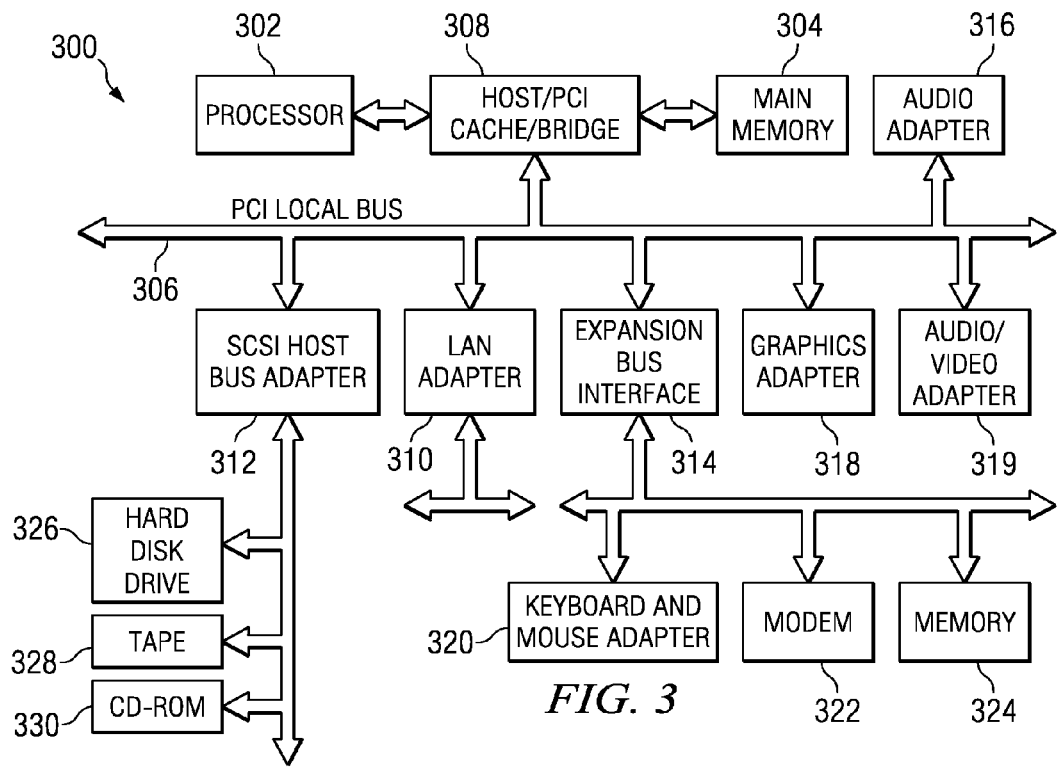

FIG. 3

Case 0: Wrong value
SYSTEM: Let me summarize your request. You want to transfer 500 dollars from your checking to savings on May 15th. Is that right?
USER: No.
SYSTEM: What is wrong? Source account, destination account, amount or date?
USER: Amount.
SYSTEM: How much you would like to transfer then?
USER: Three hundred dollars.
SYSTEM: OK. Let me summarize your request. You want to transfer 300 dollars from your checking to savings on May 15th. Is that right?

FIG. 4
(PRIOR ART)

Case 1: Correct values, user does not interrupt

502 — SYSTEM: *Let me summarize your request. Please interrupt me if I am wrong. You want to transfer 500 dollars <1 SECOND PAUSE> from your checking <1 SECOND PAUSE> to savings <1 SECOND PAUSE> on May 15th <1 SECOND PAUSE>.*

Case 2: Wrong values, user interrupts

520 — SYSTEM: *Let me summarize your request. Please interrupt me if I am wrong. You want to transfer 500 dollars <1 SECOND PAUSE>*

524 — USER (interrupting the prompt): *Its three hundred dollars.*

526 — SYSTEM: *OK. Let me start again: You want to transfer 300 dollars <1 SECOND PAUSE> from your checking <1 SECOND PAUSE> to savings <1 SECOND PAUSE> on May 15th <1 SECOND PAUSE>.*

606 — No, that's X.
　　　　It is X. — 604
602 — X
　　　　No, I did not say "V(i)", I said X. — 608

610 — C(0,1) Let me summarize your request. Please interrupt me if I am wrong.
612 — C(0,2) OK. Let me start again:

616 — C(1,i) = Leaving from V(1) <PAUSE> — 614
　　　　C(2,i) = Arriving in V(2) <PAUSE>

FIG. 7

START:

702 — set j = 0

704 — PLAY C(0,j)

706 — set i = 1;

708 — while ( i <= N) {

710 — PLAY C(i,j) and ACTIVATE G(i)
　　712 — if (barge-in ) {
　　　　　　collect new V(i) from speech recognition engine
　　　714 { set i = 0;
　　　　　　set j = j + 1;
　　　　　　PLAY C(0,j);
　　　　}

716 — set i = i + 1;

}

METHOD AND APPARATUS FOR MULTIPLE VALUE CONFIRMATION AND CORRECTION IN SPOKEN DIALOG SYSTEM

This application is a continuation of application Ser. No. 11/117,948, filed Apr. 29, 2005, status pending.

BACKGROUND OF THE INVENTION

1. Technical Field

The present invention relates generally to spoken dialog systems, and more particularly, to a method and system for multiple value confirmation and correction in spoken dialog systems.

2. Description of Related Art

With today's expansive growth in both the computer and the telecommunications industries, companies are increasingly looking for ways in which to leverage their information systems operations by merging previously separate functions. A common example of such a technological merge is the wide-ranging acceptance of spoken dialog systems that provide automated services to callers. Spoken dialog systems may function using a variety of computer applications, such as a speech recognition engine, where there exists a need to understand human speech. Spoken dialog systems may extract relevant information from the caller dialog and then supply this information to another application program or system to perform a desired task.

Conventional spoken dialog systems are generally based on the underlying assumption that the speech recognition process is not a perfect process. To address this problem, existing spoken dialog systems use various error handling techniques to fix information captured incorrectly from the dialog. For example, if a customer wants to withdraw a certain amount of money from a bank account, the customer conveys this information to the spoken dialog system, which in turn collects and verifies the information by asking the customer that the amount to be withdrawn as understood by the system is correct. If the information is incorrect, the customer may state that the amount is wrong, receive a request from the system for a corrected amount, and then convey the correct amount to be withdrawn.

However, a common drawback to existing error handling techniques in spoken dialog systems arises in situations where there is a need for a spoken dialog system to collect and confirm multiple values from a user. With conventional systems, error correction is performed using multiple turns of interaction between the system and the user. For example, in a fund transfer operation of a banking application, the system needs to collect from the customer the source and destination accounts, the amount to be transferred, and the date. Once all of the values have been collected, the system may recap the transaction with a single sentence, such as, "Do you want to transfer 500 dollars from your checking to savings on May 15th?" At this point, if the recapped information is incorrect, the user may be engaged in a correction interaction by first stating which attributes in the sentence are wrong, and then giving, for each wrong attribute, the correct value. For instance, if the user answers "no" to the previous question, the system may ask, "Please say what is wrong: source account, destination account, amount, or date?" This current error correction process is inefficient, as it requires multiple interactions between the system and the user. The user must first confirm that the system has captured some incorrect values, then specify which of the captured values are wrong, and finally correct those values one at a time.

Therefore, it would be beneficial to have a method and system for reducing the amount of interaction necessary to correct errors in the values captured by the spoken dialog system by allowing a user to correct the values directly.

SUMMARY OF THE INVENTION

The present invention provides a method, system, and computer program product for multiple value confirmation and correction in spoken dialog systems. With the mechanism of the present invention, a user is allowed to correct errors in values captured by the spoken dialog system, such that the interaction necessary for error correction between the system and the user is reduced. When the spoken dialog system collects a set of values from a user, the system provides a spoken confirmation of the set of values to the user. The spoken confirmation comprises the set of values and a prompt associated with each value. Upon hearing an incorrect value, the user may react and barge-in the spoken confirmation and provide a corrected value. Responsive to detecting the user interruption within in a prompt, the system halts the spoken confirmation and collects the corrected value. The system then provides a new spoken confirmation to the user, wherein the new spoken confirmation includes the corrected value.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates a block diagram of a data processing system in accordance with a preferred embodiment of the present invention;

FIG. 4 illustrates an example of a known correction method between a spoken dialog system and a user;

FIG. 5A illustrates an example scenario where the spoken dialog system responds with correct values in accordance with a preferred embodiment of the present invention;

FIG. 5B illustrates an example scenario where the spoken dialog system responds with incorrect values in accordance with a preferred embodiment of the present invention;

FIG. 6 illustrates an example correction grammar and carrier phrase template in accordance with a preferred embodiment of the present invention; and FIG. 7 depicts an exemplary algorithm for multiple value confirmation and correction in spoken dialog systems in accordance with a preferred embodiment of the present invention.

DETAILED DESCRIPTION OF THE PREFERRED EMBODIMENT

Figure 1:
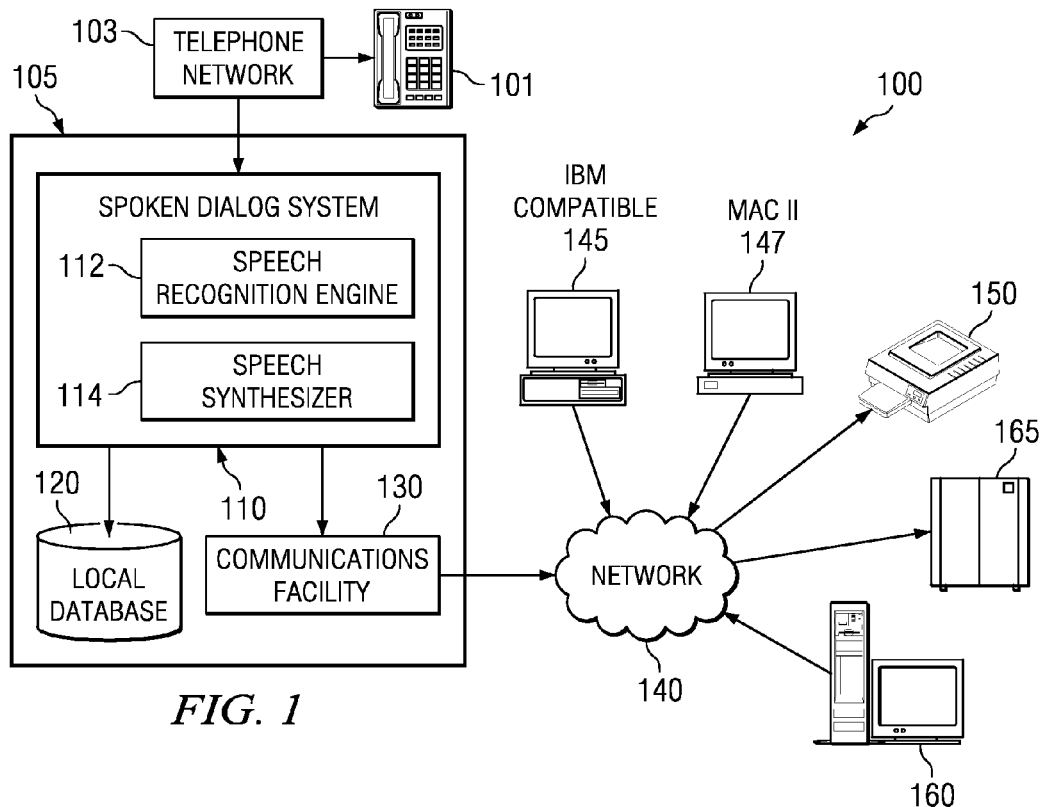
FIG. 1 is a pictorial representation of a distributed data processing system in which a preferred embodiment of the present invention may be implemented.

With reference now to the figures, and in particular with reference to FIG. 1, a pictorial representation of a distributed data processing system is depicted in which a preferred embodiment of the present invention may be implemented. As shown, network server 105 in distributed data processing system 100 includes spoken dialog system 110. Spoken dialog system 110 receives voice information from a user interface, such as, for example, telephone 101. In this illustrative example, telephone 101 is connected to network server 105 via communication network 103. The voice input may originate from one of many different devices, such as a desktop computer, a telephone, a personal digital assistant, etc. Software applications within spoken dialog system 110 interact with callers using spoken prompts. Callers interact with spoken dialog system 110 using speech. Spoken dialog system 110 accesses data from local database 120 in response to commands received from callers and may also write information to local database 120 based on responses received from the callers.

Spoken dialog system 110 comprises speech recognition engine 112 and speech synthesizer 114. Speech recognition system 112 is used to process voice input received from a user. Speech recognition system 112 may translate the voice input to a text form that is suitable for processing by server 105. Speech synthesizer 114 is used to create a voice output. Speech synthesizer 114 converts the text generated by the system to voice form. Methods of speech recognition and speech synthesis are known in the art.

Spoken dialog system 110 also may access information and write data to databases located on remote computers, via network 140. Server 105 includes a communications facility 130 to facilitate communications between voice processing software 110 and remote computers. Distributed data processing system 100 is a network of computers in which the present invention may be implemented. Distributed data processing system 100 contains network 140, which is the medium used to provide communications links between various devices and computers connected within distributed data processing system 100. Network 140 includes printer 150, client machines 145 and 147, and network servers 160 and 165. Network 140 may also include permanent connections, such as wire or fiber optic cables, or temporary connections made through telephone connections.

Network 140 may include more or fewer devices than are depicted in FIG. 1. Furthermore, network 140, as shown, is a local area network ("LAN"). However, network 140 may be other kinds of networks, such as, but not limited to, wide area networks ("WANs"). Distributed data processing system 100 in FIG. 1 is intended as an example and not as an architectural limitation for the processes of the present invention.

Figure 2:
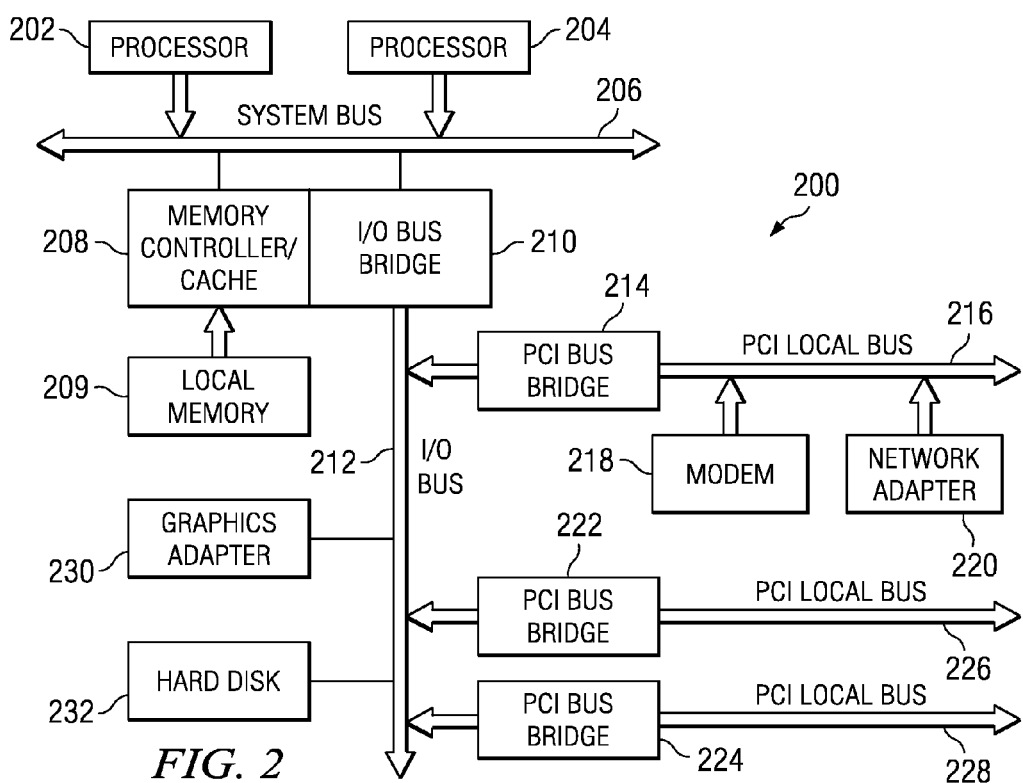
FIG. 2 depicts a block diagram of a data processing system that may be implemented as a server in accordance with a preferred embodiment of the present invention.

Referring to FIG. 2, a block diagram of a data processing system that may be implemented as a server, such as server 105 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer such as client machines 145 and 147. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned previously, the present invention provides a mechanism for multiple value confirmation and correction in spoken dialog systems. The mechanism of the present invention allows for increasing the efficiency of the interaction between the spoken dialog system and a user with regard to error correction. In contrast with conventional spoken dialog systems, which may require multiple turns of interaction between the system and the user to correct an error in a spoken confirmation, the present invention allows a user to correct a value as the value is spoken. In the illustrative examples, a prompt is provided as an utterance spoken by the system which includes the values that the user provided, as they are understood by the system. A pause is inserted after each value spoken by the system to give users enough time to react after they hear the value. A pause is defined as the length of time during which the system does not speak. The user may interrupt during the pause or while the system is speaking. The prompt is dynamically constructed depending on the values that are collected by the dialog system from the user, with the insertion of pauses that account for the time of the user reaction. The user is invited to interrupt (barge-in) the prompt upon hearing an incorrect value, and state the correct value.

For example, consider an airline passenger who would like to know the gate from which the passenger's plane is departing. The passenger calls the airline's information system, which proceeds to collect the departure city (e.g., Austin), arrival city (e.g., San Francisco), date (e.g., tomorrow), and departure time (e.g., 9 am) information from the passenger. The system confirms the collected values for each attribute by stating:

"The flight is leaving from Boston <1 second pause> to San Francisco <1 second pause> tomorrow <1 second pause> at 9 am <1 second pause>."

Since the user is leaving from Austin rather than Boston, the user may interrupt the system confirmation at any point after the incorrect value "Boston" is spoken for the departure city attribute and before the next value "San Francisco" for the arrival city attribute is spoken. If the system provides adequate time between the speaking of the values during the system prompt for a user to react and barge-in with a correction, the time stamp of the user interruption may be used to unambiguously detect which value the user has indicated is wrong and correct it right away. In response to an interruption, the system may halt the confirmation, collect the new value, and re-issue a new confirmation with the correct value. Thus, in contrast with existing systems, the user does not need to specify which of the values spoken by the system is wrong, as the user's interruption of the system confirmation may indicate which value is wrong and should be corrected. In this manner, a user is allowed to correct errors in values captured by the spoken dialog system, such that the interaction necessary for error correction between the system and the user is reduced.

In addition, the mechanism of the present invention also allows for modifying, based on the user's previous responses, the duration of each pause and the intonation of each value in the confirmation. These modifications may be based on the confidence level the system has in each collected value as well as to imitate human speech patterns. The duration of the pauses and intonation may be empirically tuned depending on the applications. For example, suppose that the system has collected the four values above from a user and then proceeds to confirm these values. The user then interrupts the system's confirmation within the prompt for the third value (e.g., departure date), and provides a corrected value (e.g., today). When the system reconfirms with the corrected third value, since the user did not interrupt the system during the first and second prompts, the system assumes the accuracy of the first two values and may thus decrease the pause length in the first and second values of the prompt. In addition to or alternatively, the system may increase the pause length of the third prompt, to allow the user additional time to re-correct the value again if necessary. Thus, pauses between values may be lengthened or shortened based on the system's perceived accuracy of each value. In a similar manner, the wording or intonation of the system confirmation may be modified. The system may alter its intonation like a human speaker might when stating a value that the speaker is not sure is correct.

Turning now to FIG. 4, an example of a known correction method between a spoken dialog system and a user is shown. The example in FIG. 4 is a fund transfer operation of a banking application, wherein the system needs to collect multiple values from the customer, such as the source and destination accounts, the amount to be transferred, and the date. In a typical spoken dialog system, the system requires three pieces of information to be able to confirm a set of multiple values received from the user. The first piece of information needed by the system is whether all of the values in the set collected by the system are correct (1). If any of the values in the set are wrong, the second piece of information needed by the system is which particular values are incorrect (2). The third piece of information needed by the system is the corrected values (3).

As shown in the example dialog in FIG. 4, existing spoken dialog systems explicitly request information (1) and (2) from the user, in order to be able to prompt for (3) corrected values one at a time. In this case, an incorrect value has been collected by the system. In this traditional method, the system is shown to confirm the user input (line 402), by stating, for example, "You want to transfer 500 dollars from your checking to savings on May 15$^{th}$." The user is then asked to confirm whether all of the values in the set of values are correct (line 404). If one or more values are incorrect, the user must first state that some of the values are indeed not correct (line 406). The system then requests that the user identify which one, or which ones, of the values are wrong (line 408). Based on the user response (line 410), the system requests a corrected value from the user (line 412). When the user provides a corrected value (line 414), the system may then re-confirm the transaction with the updated value (line 416). Thus, the example error correction process described above is inefficient, as it requires multiple interactions between the system and the user. The user must first confirm that the system has captured some incorrect values, then specify which of the captured values are wrong, and finally correct those values one at a time.

In contrast with the known process described in FIG. 4, the present invention invites users to correct the values as each value is spoken by the system. Using the same values collected in the fund transfer operation example in FIG. 4, FIGS.

5A and 5B illustrate how the spoken dialog system of the present invention responds with user collected values. In particular, FIG. 5A, illustrates an example scenario where the spoken dialog system responds with correct values in accordance with a preferred embodiment of the present invention. As shown, the mechanism of the present invention uses prompts placed in between the values in a confirmation. For example, confirmation 502 includes several prompts, such as one-second pauses 504-510. These prompts may be dynamically constructed depending on the values that are collected by the user. Pauses are inserted in the confirmation that account for the time of the user reaction. For example, the system collects values, such as transfer amount, source, destination, and date, from a user. If the values in confirmation 502 are correct, then the user does not interrupt the system.

FIG. 5B illustrates an example scenario where the spoken dialog system responds with incorrect values in accordance with a preferred embodiment of the present invention. The spoken dialog begins confirmation 520 which includes the collected transfer amount, source, destination, and date values for the fund transfer operation. In this case, the system has collected the value of "500 dollars" as the transfer amount, but the user only actually only wants to transfer "300 dollars". As shown, as the transfer amount is incorrect, the user may interrupt confirmation 520 within transfer amount prompt 522. User interrupt 524 specifies that the correct value for the transfer amount is "300 dollars". In response, the system proceeds to re-confirm 526 the fund transfer with the updated transfer amount. If the remaining values in re-confirmation 516 are correct, the user does not interrupt the system, and the transaction is completed. Thus, in comparison with the number of turns required to be performed by the user to correct a confirmation error in FIG. 4, it is clear that with the present invention, less system-user interaction is needed for error correction, thereby increasing the efficiency of the transaction.

As previously mentioned, the duration of the pauses in subsequent re-confirmations may be empirically tuned depending on the applications. The system may also alter the wording and intonation present in the re-confirmations. These alterations may be dependent upon the systems confidence in the accuracy of the collected values. The system may modify the pauses and intonation in re-confirmation 516, as the system knows it provided an incorrect value in the previous confirmation. For instance, the system may state:

"You want to transfer <emphasis>300 dollars</emphasis><long pause><faster rate:> from your savings account to your checking account on May 15$^{th}$</faster rate>."

Thus, the user may be provided additional time to interrupt the transfer amount in the re-confirmation. Likewise, the system may change its intonation when expressing the transfer amount. Just as a human speaker may modify the intonation when stating a value that the speaker is not sure is correct, the system may also express the transfer amount with the appropriate intonation.

FIG. 6 illustrates an example correction grammar and carrier phrase template in accordance with a preferred embodiment of the present invention. In this illustrative example, the spoken dialog system needs to confirm N attributes: A(i), i=1, ..., N. The values, V(i), i=1, ..., N, for each attribute A have already been collected by the system in a previous transaction. In addition, each attribute A may be associated with a correction grammar: G(i), i=1, ..., N. The correction grammar is used by the present invention to allow a user to correct a confirmation value in all ways possible. For instance, a user interrupts a prompt with a correct value "X", where X is one of the possible values from attribute A(i) and is different from V(i). The correction grammar allows the user to make the correction in various ways, such as by expressing merely the correct value 602, as well as expressing the correction through various other possible sentence structures 604-608.

The correction prompt requires a carrier phrase template that is specified at design time and depends on the application and the attributes A(i). A carrier phrase is the part of the system prompt that is generally constant. For instance, while the values spoken by the system for each attribute in the confirmation may change, the remaining parts of the prompt are constant. Generally, the carrier phrase may be viewed as being composed of N+1 elements: C(i, j), where i=0, N, and j=1, ..., M. The first index, or "i", of the carrier phrase elements denotes the carrier phrase's association with the attributes. The second index, or "j", is the turn repetition count for the confirmation. In other words, the second index keeps track of the number of times the system has had to confirm the values collected by the user. As shown, C(0, j) 610 and 612 are initial parts of a carrier phrase. C(0, j) is the initial part of the carrier phrase as the first index is 0; thus C(0, j) is not associated with any attributes and does not express any values. In contrast, C(1, j) 614 and C(2, j) 616 are shown to be associated with attributes A(1) and A(2), respectively. In this example, A(1) is a flight origin attribute and A(2) is a flight destination attribute, wherein V(1) is a particular value for attribute A(1), and V(2) is a particular value for attribute A(2).

Turning next to FIG. 7, an exemplary algorithm for multiple value confirmation and correction in spoken dialog systems in accordance with a preferred embodiment of the present invention is shown. The algorithm in FIG. 7 may be implemented in a data processing system, such as data processing system 200 in FIG. 2. The example algorithm first begins with setting the repetition count value "j" to 0 702, as this is the first turn in the transaction. The system is then instructed to play the initial carrier phrase C(0, j) 704, and the first index "i" in the carrier phrase is set to 1 706. As the carrier phrase attribute index is now 1, the system is instructed to express the value of the first attribute, or A(1) 710. In addition, the correction grammar G(i) for the particular attribute A(1) is activated. If the system detects that the user has interrupted the confirmation 712, the system collects the new value of attribute A(1) spoken by the user from the speech recognition engine 714. The system also sets the first index value "i" to 0, and adds 1 to the second index value "j". The system is then instructed to play the initial carrier phrase C(0, j), wherein the repetition count is now j=1. The first index value is then set to i+1 716.

Steps 710-716 of the process are repeated until i>N 708, or all attribute values in the carrier phrase have been played to the user, unless the user barges in (712) and interrupts the prompt.

Thus, the present invention provides a mechanism for multiple value confirmation and correction in spoken dialog systems. The advantages of the present invention should be apparent in view of the detailed description provided above. A user may eventually correct values in a spoken confirmation using existing methods. However, such methods may require multiple turns of interaction between the system and the user to correct the error. In contrast, the present invention allows for increasing the efficiency of the spoken dialog confirmation process by reducing the interaction required to correct an error by allowing a user to correct a value as the value is spoken.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for multiple value confirmation and correction in a spoken dialog system, the method comprising:
    responsive to collecting a set of values from a user, inviting the user to interrupt a spoken confirmation of the set of values, previously collected from the user, upon hearing an incorrect value, to correct the incorrect value;
    presenting the spoken confirmation of the set of previously collected values to the user, wherein the spoken confirmation includes a sequence of prompts spoken by the spoken dialog system, the sequence of prompts comprising spoken confirmation values of the set of previously collected values as understood by the spoken dialog system and a pause after each of the spoken confirmation values, each pause except the last immediately followed by a next spoken confirmation value in the sequence of prompts;
    detecting a user interruption of a spoken confirmation value or a pause in the sequence of prompts, wherein the user interruption comprises an indication that the spoken confirmation value is incorrect;
    responsive to detecting the user interruption, halting the sequence of prompts being spoken by the spoken dialog system and collecting a corrected value from the user; and
    providing a new spoken confirmation to the user, wherein the new spoken confirmation includes the corrected value.

2. The method of claim 1, wherein detecting a user interruption comprises using one or more correction grammars to allow for stating a value correction in multiple ways.

3. The method of claim 1, wherein a time stamp is used to determine the value after which the user interruption occurred.

4. The method of claim 1, wherein the spoken confirmation and the new spoken confirmation comprise at least one carrier phrase.

5. The method of claim 1, further comprising:
    repeating the detecting, halting, and providing steps until the set of values in the new spoken confirmation are correct.

6. The method of claim 1, wherein the new spoken confirmation is dynamically tuned based on the spoken dialog system's confidence in accuracy of the set of values.

7. The method of claim 1, further comprising:
    modifying the duration of the pause based on the spoken dialog system's confidence in an accuracy of the value.

8. The method of claim 1, further comprising:
    modifying the intonation of the new spoken confirmation based on the spoken dialog system's confidence in an accuracy of the value.

9. The method of claim 1, wherein the user interruption for the value is detected within a predetermined time interval after the value is spoken.

10. A spoken dialog system comprising a processor and a memory encoded with computer-executable instructions that, when executed by the processor, perform a method for multiple value confirmation and correction, comprising:
    responsive to collecting a set of values from a user, inviting the user to interrupt a spoken confirmation of the set of values, previously collected from the user, upon hearing an incorrect value, to correct the incorrect value;
    presenting the spoken confirmation of the set of previously collected values to the user wherein the spoken confirmation includes a sequence of prompts spoken by the spoken dialog system, the sequence of prompts comprising spoken confirmation values of the set of previously collected values as understood by the spoken dialog system and a pause after each of the spoken confirmation values, each pause except the last immediately followed by a next spoken confirmation value in the sequence of prompts;
    detecting a user interruption of a spoken confirmation value or a pause in the sequence of prompts, wherein the user interruption comprises an indication that the spoken confirmation value is incorrect;
    halting the sequence of prompts being spoken by the spoken dialog system in response to detecting the user interruption;
    collecting a corrected value from the user in response to detecting the user interruption; and
    providing a new spoken confirmation to the user, wherein the new spoken confirmation includes the corrected value.

11. The spoken dialog system of claim 10, wherein detecting a user interruption comprises using one or more correction grammars to allow for stating a value correction in multiple ways.

12. The spoken dialog system of claim 10, wherein a time stamp is used to determine the value after which the user interruption occurred.

13. The spoken dialog system of claim 10, wherein the spoken confirmation and the new spoken confirmation comprise at least one carrier phrase.

14. The spoken dialog system of claim 10, wherein the method further comprises:
    repeating the detecting, halting, and providing steps until the set of values in the new spoken confirmation are correct.

15. The spoken dialog system of claim 10, wherein the new spoken confirmation is dynamically tuned based on the spoken dialog system's confidence in accuracy of the set of values.

16. The spoken dialog system of claim 10, wherein the method further comprises:
    modifying the duration of the pause based on the spoken dialog system's confidence in an accuracy of the value.

17. The spoken dialog system of claim 10, wherein the method further comprises:

modifying an intonation of the new spoken confirmation based on the spoken dialog system's confidence in an accuracy of the value.

18. A computer-readable storage device encoded with computer-executable instructions that, when executed by a computing device, perform a method for multiple value confirmation and correction in a spoken dialog system, the method comprising:

responsive to collecting a set of values from a user, inviting the user to interrupt a spoken confirmation of the set of values, previously collected from the user, upon hearing an incorrect value, to correct the incorrect value;

presenting the spoken confirmation of the set of previously collected values to the user, wherein the spoken confirmation includes a sequence of prompts spoken by the spoken dialog system, the sequence of prompts comprising spoken confirmation values of the set of previously collected values as understood by the spoken dialog system and a pause after each of the spoken confirmation values, each pause except the last immediately followed by a next spoken confirmation value in the sequence of prompts;

detecting a user interruption of a spoken confirmation value or a pause in the sequence of prompts, wherein the user interruption comprises an indication that the spoken confirmation value is incorrect;

halting the sequence of prompts being spoken by the spoken dialog system and collecting a corrected value from the user in response to detecting the user interruption; and providing a new spoken confirmation to the user, wherein the new spoken confirmation includes the corrected value.

19. A method for a multiple value confirmation and correction in a spoken dialog system, the method comprising:

responsive to collecting a set of values from a user, inviting the user to interrupt a spoken confirmation of the set of values, previously collected from the user, upon hearing an incorrect value, to correct the incorrect value;

presenting the spoken confirmation of the set of previously collected values to the user, wherein the spoken confirmation includes a sequence of prompts spoken by the spoken dialog system, the sequence of prompts comprising spoken confirmation values of the set of previously collected values as understood by the spoken dialog system and a pause after each of the spoken confirmation values, each pause except the last immediately followed by a next spoken confirmation value in the sequence of prompts;

detecting a user interruption of at least one of a spoken confirmation value or a pause during the spoken confirmation, wherein the user interruption comprises an indication that the spoken confirmation value is incorrect;

responsive to detecting the user interruption, halting the sequence of prompts being spoken by the spoken dialog system and collecting from the user a corrected value corresponding to the spoken confirmation value;

providing a new spoken confirmation to the user, wherein the new spoken confirmation includes the corrected value;

repeating the acts of detecting, halting, collecting and providing until values in the new spoken confirmation are correct; and responsive to lack of detecting a user interruption during the sequence of prompts of he spoken confirmation, confirming the set of values.

* * * * *